US008671424B2

(12) United States Patent
Skinner

(10) Patent No.: US 8,671,424 B2
(45) Date of Patent: Mar. 11, 2014

(54) LOG-BASED TARGETING OF ADVERTISEMENTS TO GROUPS

(75) Inventor: James L. Skinner, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 870 days.

(21) Appl. No.: 12/121,716

(22) Filed: May 15, 2008

(65) Prior Publication Data

US 2009/0288113 A1 Nov. 19, 2009

(51) Int. Cl.
*H04N 7/10* (2006.01)

(52) U.S. Cl.
USPC ............... 725/32; 725/33; 725/34; 725/35; 725/36

(58) Field of Classification Search
USPC ...................................... 725/32–36
See application file for complete search history.

(56) References Cited

U.S. PATENT DOCUMENTS

| | | | |
|---|---|---|---|
| 6,425,127 B1 * | 7/2002 | Bates et al. ................. | 725/32 |
| 6,698,020 B1 * | 2/2004 | Zigmond et al. ............ | 725/34 |
| 6,708,335 B1 * | 3/2004 | Ozer et al. .................. | 725/20 |
| 2003/0115596 A1 * | 6/2003 | Okajima et al. ............ | 725/34 |
| 2005/0216932 A1 * | 9/2005 | Danker ....................... | 725/32 |
| 2006/0143674 A1 * | 6/2006 | Jones et al. ................. | 725/113 |
| 2008/0060002 A1 * | 3/2008 | Noll et al. ................... | 725/35 |
| 2008/0155623 A1 * | 6/2008 | Ota ............................. | 725/109 |
| 2008/0313033 A1 * | 12/2008 | Guo et al. ................... | 705/14 |

OTHER PUBLICATIONS

"YouTube InVideo Ads", downloaded May 12, 2008 from "http://www.google.com/youtube/advertise/YouTubeInvideoAds.pdf", pp. 1.

\* cited by examiner

*Primary Examiner* — Nicholas Corbo
(74) *Attorney, Agent, or Firm* — Micah Goldsmith; Glen Johnson; Micky Minhas

(57) ABSTRACT

In accordance with one or more aspects, a consumer device obtains advertisement event data indicating a time when an advertisement is to be presented, and maintains the advertisement event data in a log. Advertisement data corresponding to the advertisement event data is presented at the indicated time if the advertisement event data corresponds to a subscriber group of which the consumer device is a member, otherwise the advertisement data is not presented. In accordance with one or more other aspects, program event data and advertisement event data are both obtained. Electronic program guide data is generated including both the program data and the advertisement event data, and is sent to one or more consumer devices.

20 Claims, 7 Drawing Sheets

LOG-BASED TARGETING OF ADVERTISEMENTS TO GROUPS

BACKGROUND

Television advertising has traditionally followed an approach in which commercial segments are interspersed between program segments. The particular advertisements that are displayed during these commercial segments are typically the same for all televisions within a particular programming market. For example, all the televisions in a particular city or county (or large portions thereof) may receive the same advertisements. While this type of advertising can be effective, it can also be problematic because it restricts advertising to the granularity of the particular programming market. Programming markets typically include a variety of different types of users, but traditional advertising mechanisms do not allow differentiation in advertising for those different types of users within the same programming market.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a consumer device obtains advertisement event data indicating a time when an advertisement is to be presented, and maintains the advertisement event data in a log. Advertisement data corresponding to the advertisement event data is presented at the indicated time if the advertisement event data corresponds to a subscriber group of which the consumer device is a member, otherwise the advertisement data is not presented.

In accordance with one or more other aspects, program event data and advertisement event data are both obtained. Electronic program guide data is generated including both the program data and the advertisement event data, and is sent to one or more consumer devices.

BRIEF DESCRIPTION OF THE DRAWINGS

The same numbers are used throughout the drawings to reference like features.

DETAILED DESCRIPTION

Log-based targeting of advertisements to groups is discussed herein. Advertisement events are maintained in a log, such as an electronic program guide (EPG), on a consumer device. Each advertisement event has corresponding advertisement data, such as a bug to be displayed on the consumer device. Each advertisement event also has a corresponding event time and a corresponding subscriber group. The log is monitored and at the event time the corresponding advertisement event is displayed or otherwise presented if the consumer device is a member of the subscriber group corresponding to the event. The advertisement data can have been previously downloaded to the consumer device, or alternatively can be streamed to the consumer device when the event is triggered.

Figure 1:
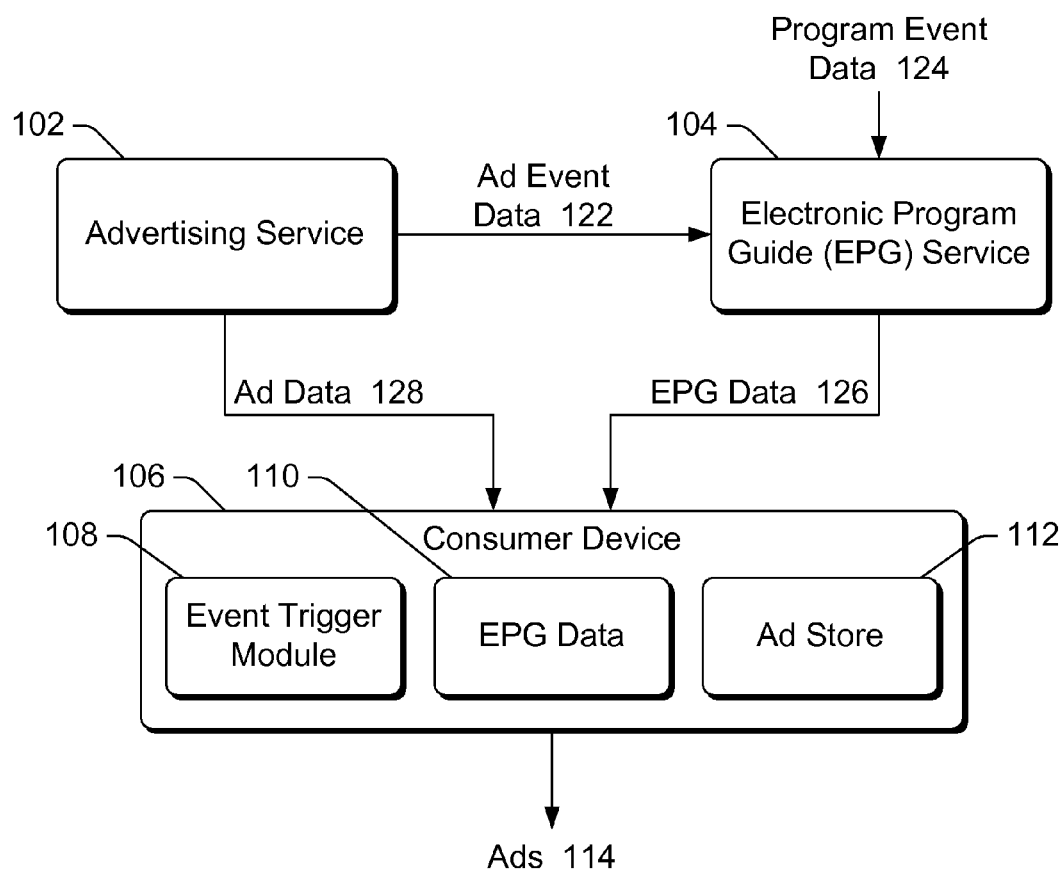
FIG. 1 illustrates an example system implementing the log-based targeting of advertisements to groups in accordance with one or more embodiments.

FIG. 1 illustrates an example system 100 implementing the log-based targeting of advertisements to groups in accordance with one or more embodiments. System 100 includes an advertising service 102, an electronic program guide (EPG) service 104, and a consumer device 106. Service 102, service 104, and device 106 can communicate with one another using a variety of different networks, such as the Internet, a local area network (LAN), a public telephone network, an intranet, other public and/or proprietary networks, combinations thereof, and so forth. Service 102, service 104, and device 106 can alternatively communicate with one another in other manners, such as by transferring data using a variety of different storage media, such as optical media (e.g., CD, DVD, etc.), magnetic media, solid state media, and so forth.

Consumer device 106 can be a variety of different types of devices capable of displaying or otherwise presenting advertisements (ads). For example, consumer device 106 can be a desktop computer, a mobile station, an entertainment appliance, a set-top box communicatively coupled to a display device, a cell or other wireless phone, a game console, an automotive computer, and so forth. Thus, consumer device 106 may range from a full resource device with substantial memory and processor resources (e.g., personal computers, game consoles) to a low-resource device with limited memory and/or processing resources (e.g., traditional set-top boxes, hand-held game consoles).

Each of advertising service 102 and EPG service 104 can be implemented by one or more server computing devices. Similar to the discussion of consumer device 106, these server computing devices can be a variety of different types of devices, ranging from full resource devices with substantial memory and processor resources to a low-resource device with limited memory and/or processing resources.

For ease of explanation, a single advertising service 102, EPG service 104, and consumer device 106 are illustrated in system 100. However, it is to be appreciated that multiple such services and devices can be included in system 100. For example, multiple consumer devices 106 of the same or different types can be used with the same advertising service 102 and/or EPG service 104. By way of another example, multiple advertising services 102 and/or EPG services 104 can be included in system 100.

Consumer device 106 includes an event trigger module 108 and EPG data 110. EPG data 110 includes multiple program events and ad events. Program events identify different programs that can be displayed by consumer device 106, such as different movies, documentaries, talk shows, sitcoms, video on demand (VOD) programs, audio programs, and so forth. Ad events identify different advertisements that can be displayed by consumer device 106. The events in EPG data 110 typically have an associated event time indicating when the event is to occur, such as when a particular program is available, when a particular advertisement is to be displayed, and so forth. Event trigger module 108 monitors EPG data 110, displaying or otherwise presenting advertisements when the corresponding ad event indicates to do so.

In the discussions herein, ad events are discussed primarily with reference to being stored by consumer device 106 in a log that is EPG data (such as EPG data 110). In alternate embodiments, however, ad events are stored as part of one or more different logs or records, and need not be stored in a same log as program events are stored. Event trigger module 108 accesses such different logs or records and uses the ad event data included therein in the same manner as discussed herein with reference to accessing and using the EPG data.

Consumer device 106 also optionally includes an ad store 112. Ad store 112 stores ads to be displayed as ads 114 by consumer device 106. Ad store 112 can be implemented as part of consumer device 106 (e.g., an internal magnetic disk, internal solid state memory, and so forth) or alternatively external to consumer device 106 (e.g., a removable storage device, a remote storage device, and so forth).

Advertising service 102 generates ad event data 122. Advertising service 102, and/or users thereof, typically select times for when particular ads are to be presented by consumer device 106. These selected times can vary based on, for example, times during which other ads are expected to be displayed, times when particular programs or commercials are broadcast or scheduled for playback at consumer device 106, and so forth. Alternatively, the times for displaying particular ads can be selected in different manners, such as randomly, based on revenue received for the ads, other rules and/or criteria, and so forth.

In the illustrated example of system 100, advertising service 102 sends ad event data 122 to EPG service 104. EPG service 104 also receives program event data 124 from any of a variety of different sources (e.g., network broadcasters, cable TV or satellite TV distributors, other third parties, and so forth). Program event data 124 describes different programs (e.g., movies, documentaries, talk shows, sitcoms, audio programs, and so forth), including start and end times for the programs. At consumer device 106, this program event data allows device 106 to display an EPG, providing a user of device 106 with an indication of the various programs that are available and/or scheduled. EPG service 104 combines program event data 124 and ad event data 122 to generate EPG data 126, which is sent to consumer device 106. The EPG data 126 is received by consumer device 106 and stored as EPG data 110.

EPG service 104 can combine program event data 124 and ad event data 122 in a variety of different manners. In one or more embodiments, EPG service 104 generates a record or table including both event data 124 and event data 122. Update records or tables can be sent to consumer device 106 as EPG data 126 when new event data 124 and/or event data 122 is received by service 104, or at other regular or irregular intervals. These update records or tables can replace previously sent EPG data 126, or alternatively can be added onto previously sent EPG data 126.

System 100 illustrates EPG service 104 receiving ad event data 122. Alternatively, EPG data 126 includes program event data 124 but not ad event data 122. Rather, ad event data 122 is communicated directly to consumer device 106. A module on consumer device 106 (e.g., module 108 or alternatively another module) receives ad event data 122 and incorporates (adds) the received ad event data 122 into EPG data 110. In such situations, ad event data 122 can be received separately from, or alternatively packaged together with, ad data 128.

Regardless of the manner in which ad event data 122 is received by consumer device 106, consumer device 106 receives ad data 128 corresponding to ad event data 122. In one or more embodiments, each ad event in ad event data 122 has a corresponding or associated ad in ad data 128. The ad event describes when the corresponding ad is to be displayed or otherwise presented as an ad 114 by consumer device 106.

Ads 114 can be displayed or otherwise presented in a variety of different manners. In one or more embodiments, ads 114 are displayed as bugs (in which case the ad event data can also be referred to as bug event data, and the ad data can also be referred to as bug data). A bug refers to visual content (typically an image and/or video) that overlays a portion of a program being displayed. A bug is typically temporary and smaller than the other video being displayed as part of the program. For example, a bug can be displayed along the bottom or in a corner of the program being displayed. A bug can be at least partially transparent, allowing the program being overlaid to still be seen. Alternatively, a bug can be opaque.

In other embodiments, ads 114 can be displayed or otherwise presented in other manners. For example, one or more ads 114 can overlay the entirety of another program being displayed by consumer device 106. By way of another example, the display of another program by consumer device 106 can be paused while one or more ads 114 are displayed. By way of yet another example, audio content can be played back as an ad 114 in addition to, or in place of, visual content being displayed.

Consumer device 106 is a member of one or more subscriber groups. The one or more subscriber groups of which consumer device 106 is a member is known to event trigger module 108. An indication of these one or more subscriber groups can be maintained by module 108, or alternatively can be maintained in a different log or store of device 106 that is accessible to module 108.

The one or more subscriber groups of which device 106 is a member can be based on different factors, such as particular characteristics of device 106, particular characteristics or preferences of one or more users of device 106, goods and/or services that have been purchased or requested by one or more users of device 106, and so forth. These different factors can be monitored by consumer device 106, and device 106 can assign itself to a particular one or more of these subscriber groups based on the monitored factors. Alternatively, another device separate from consumer device 106 can monitor these factors for consumer device 106 and assign consumer device 106 to a particular one or more of these subscriber groups based on the monitored factors.

In one or more embodiments, a user of consumer device 106 signs up for programs to be delivered to consumer device 106. The type of programs the user signs up for and/or the particular programs that are actually displayed or recorded by consumer device 106 is monitored by device 106 (or alternatively another device or service). Based on this monitoring, a particular one or more subscriber groups is assigned. For example, if a user signs up for a premium sports package so that numerous sports television channels are available to consumer device 106, then consumer device 106 can be assigned to a "sports" subscriber group. By way of another example, if a user of consumer device 106 plays back or records more than a threshold number of video on demand (VOD) programs per month (or per year or other time period), then consumer device 106 can be assigned to a "VOD" subscriber group. By way of yet another example, if one or more users of consumer device 106 play back or record more than a threshold number of hours of children's programming (e.g. per month, per day, per year, etc.), then consumer device 106 can be assigned to a "children" group. By way of still another example, device 106 can be a member of a default group, such as an "everyone" group (of which all devices 106 are members).

Alternatively, users can be members of different subscriber groups, in which case the subscriber group of which consumer device 106 is a member can change over time based on which particular user is logged into and/or using consumer device 106 at any given time. Users can be assigned to be members of different subscriber groups analogous to consumer devices being assigned to be members of different subscriber groups as discussed above. When the user logs into consumer device 106 or otherwise identifies himself or herself to consumer device 106, consumer device 106 becomes a member of the subscriber groups of which the user is a member.

Figure 2:
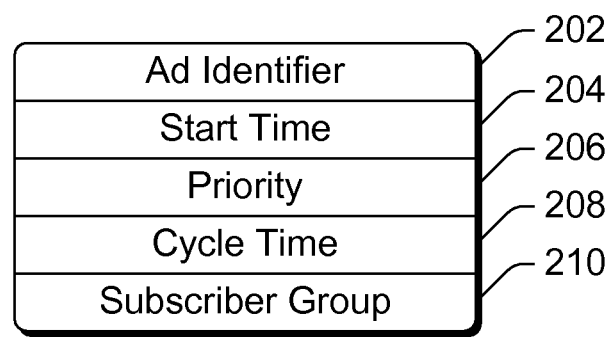
FIG. 2 illustrates an example ad event structure in accordance with one or more embodiments.

FIG. 2 illustrates an example ad event structure 200 in accordance with one or more embodiments. Ad event structure 200 can be used for the ad events discussed above, such as ad events in data 122, in EPG data 126, in EPG data 110, and so forth. Ad event structure 200 includes an ad identifier portion 202, a start time portion 204, a priority portion 206, a cycle time portion 208, and a subscriber group portion 210.

Ad identifier portion 202 includes an identifier of a particular ad corresponding to the ad event. One or more of a variety of different identifier formats can be used. For example, these identifiers can be strings of letters, numbers, symbols, combinations thereof, and so forth. In one or more embodiments, the identifier in portion 202 uniquely identifies the particular ad to module 108 (e.g., the identifier is unique in ad store 112, or unique in consumer device 106, etc.).

Start time portion 204 includes an indication of a start time for the ad event. The start time indicates when the ad corresponding to the ad event is to be displayed or otherwise presented by the consumer device. The start time can be an absolute time, such as a particular date and time. Alternatively, the start time can be a relative time, such as a date and/or time relative to some other event or time (e.g., three hours after midnight, 45 minutes after some other time or some other event occurred (e.g., another ad event, a program event, etc.)).

Priority portion 206 includes a priority for the ad event. This priority can be identified in different manners, such as using a number, letter, some other ordered set of characters and/or symbols, and so forth. Situations can arise where different events in the EPG data conflict with one another. For example, two different ad events could have the same start time or overlapping presentation times (e.g., a first ad event may start at 4:00 pm and have a duration of two minutes, while a second ad event may start at 4:01 pm and have a duration of one minute). In such situations where different events in the EPG data conflict with one another, the higher priority ad is presented while the lower priority ad is not presented.

Cycle time portion 208 includes an identifier of a cycle time for the ad event. This cycle time refers to when presentation of the ad corresponding to the ad event is to stop. The cycle time can be a duration for which the ad is to be displayed or otherwise presented, such as 15 seconds, 3 minutes, 1 hour, and so forth. Alternatively, the cycle time can specify a particular date and/or time, analogous to start time portion 204 discussed above.

Subscriber group portion 210 identifies a particular subscriber group corresponding to or associated with the ad event. A particular ad can be targeted to one or more particular subscriber groups by specifying the one or more particular subscriber groups in subscriber group portion 210 of the ad event corresponding to the ad. As discussed in more detail below, the ad corresponding to the ad event is displayed or otherwise presented by the consumer device if the consumer device is a member of the subscriber group identified in portion 210.

It is to be appreciated that ad event structure 200 is only an example, and that alternatively one or more of these portions are not included in an ad event and/or additional portions are included in the ad event. For example, priority portion 206 may not be included, or cycle time portion 208 may not be included (e.g., a same cycle time can be used for ad events). By way of another example, an additional channel or station identifier portion can be included that identifies which channel or station the ad event is to be presented on (e.g., present the ad only if that particular channel or station is being played back by the consumer device).

Returning to FIG. 1, ad data 128 can be sent to consumer device 106 using a variety of different delivery mechanisms. In one or more embodiments, ad data 128 is sent to consumer device 106 using multicasting. With multicasting, ad data 128 is sent to multiple consumer devices 106 concurrently, and multiple ones of consumer devices 106 can receive and store the multicast ad data 128. Alternatively, ad data 128 can be sent to multiple consumer devices 106 separately (e.g., using unicasting).

When multicasting ad data 128, all consumer devices 106 that receive ad data 128 can store ad data in their ad store 112. Alternatively, the multicasting can include an identifier of one or more subscriber groups that are to store the ad data 128 (for example, a multicast header can be included that identifies one or more subscriber groups). Each consumer device 106 that receives the multicast ad data checks whether the device 106 is a member of the identified subscriber group. If the device 106 is a member of the identified subscriber group, then the device 106 stores the multicast ad data 128 in ad store 112. However, if the device 106 is not a member of the identified subscriber group, then the device 106 does not store the multicast ad data 128 in ad store 112.

In one or more other embodiments, ad data 128 is sent to consumer device 106 using streaming. Using streaming, consumer device 106 requests ad data 128 from a remote source, such as advertising service 102, for a particular ad that is about to be displayed. Consumer device 106 requests ad data 128 an amount of time before the ad is to be presented. This amount of time can vary, and is typically designed so that consumer device 106 receives the ad data 128 in time to present the ad at the start time for the ad, as indicated by the corresponding ad event, or at least a sufficient portion of the ad data 128 to begin presenting the ad at the appropriate time. Advertising service 102 streams the ad to consumer device 106, allowing device 106 to display or otherwise present the ad at the appropriate time (as indicated by the corresponding ad event). With such streaming, the ad data 128 can be, but need not be, stored in ad store 112.

In one or more embodiments, combinations of these delivery mechanisms can be used. For example, ad data 128 can be multicast to multiple consumer devices 106. However, if a particular consumer device 106 does not receive the multicast (e.g., due to network problems, the consumer device 106 being turned off when the multicast is sent, etc.), then the ad data 128 can be streamed to that consumer device 106 that did not receive the multicast. Alternatively, a particular consumer device 106 may receive the multicast but not store it because the device 106 is not a member of the subscriber group identified by the multicast. However, the particular device 106 may later become a member of the subscriber group identified by the multicast. In such situations, as the ad data from the multicast was not stored by that particular device 106, it can be streamed to that particular device 106.

During operation, event trigger module 108 monitors EPG data 110. When an event in EPG data 110 has an event time (e.g., as identified in start time portion 204 of FIG. 2) that is close to the current time, then module 108 can trigger the event. For an ad event, triggering the event causes module 108 to display or otherwise present the ad corresponding to the ad event. Event trigger module 108 can determine when an event time is close to the current time in a variety of different manners. In one or more embodiments, the current time refers to a current system time (e.g., based on a clock of consumer device 106). Alternatively, the current time can refer to a separate time used in displaying a program, such as a time maintained by event trigger module 108. Additionally, in one or more embodiments the event time is determined to be close to the current time if the current time is within a threshold amount of time of the event time (e.g., 1 second, 3 seconds, etc.). This threshold amount of time can be set so that module 108 can retrieve the corresponding ad data (e.g., from ad store 112, from advertising service 102, and so forth) and present the ad data at the event time. Alternatively, the event time can be determined to be close to the current time if the current time matches (is the same as) the event time.

This triggering is also based on the subscriber group identified in the ad event. Event trigger module 108 checks whether consumer device 106 is a member of the subscriber group identified in the ad event. If the consumer device 106 is a member of the subscriber group identified in the ad event, then consumer device 106 triggers the event. If the consumer device 106 is not a member of the subscriber group identified in the ad event, then consumer device 106 does not trigger the event.

Checking whether consumer device 106 is a member of the subscriber group identified in the ad event can be performed at different times. For example, this checking can be performed after the determination is made that the event time is close to the current time. By way of another example, this checking can be performed at particular times and or intervals, such as every hour, at midnight every day, and so forth. In such situations, ad events corresponding to subscriber groups of which consumer device 106 is not a member can optionally be deleted from EPG data 110. E.g., consumer device 106 can check daily whether consumer device 106 is a member of the subscriber groups corresponding to ad events in EPG data 110 with start times in the next 24 hours, and delete those ad events corresponding to subscriber groups of which consumer device 106 is not a member.

When an ad event is triggered, the corresponding ad is displayed or otherwise presented by consumer device 106. Various modes of operation can be implemented for obtaining and presenting the ad. In one or more embodiments, event trigger module 108 checks whether the ad is available in ad store 112. If the ad is not available from ad store 112, then trigger module 108 retrieves the ad from advertising service 102, such as by downloading the ad (e.g., requesting the ad be unicast or multicast by advertising service 102) or streaming the ad. This checking can be performed just before the ad is desired to be presented (e.g., allowing the ad to be streamed to consumer device 106 just in time for presentation), or alternatively can be performed earlier (e.g., five minutes before the ad is desired to be presented). In other embodiments, if the ad is not available from ad store 112 then trigger module 108 does not present the ad. In still other embodiments, ads are streamed to consumer device 106 as discussed above, so no check for the ad being available in ad store 112 need be made (in such embodiments ad store 112 may not be included in consumer device 106).

In one or more embodiments, events are collected together by channel. Accordingly, the program events and ad events for a particular channel are organized together into the same collection. Accordingly, event trigger module 108 need only monitor events in the one or more collections corresponding to one or more current channels being displayed. For example, if a user of consumer device 106 were watching television shows on channel 237, then event trigger module 108 need not be concerned with ad events in collections corresponding to channels other than channel 237. Alternatively, rather than be collected together by channel, the events can include one or more channel identifiers. Event trigger module 108 can check the one or more channel identifiers and display or otherwise present the corresponding ad only if the one or more channel identifiers identify a channel that is currently being played back by device 106. In other alternatives, ad events can apply to all channels, in which case no distinction based on channel need be made.

It should be noted that multiple different ad events and/or program events in EPG data 110 can have a same start time (or overlapping display times). In such situations, event trigger module 108 identifies these events and triggers them as appropriate. This triggering can be based, for example, on a priority indicated in each event. For example, if two or more events conflict (e.g., have the same start time, have overlapping display times, etc.), then the higher priority event is triggered by event trigger module 108.

It should also be noted that in certain situations the presentation time for an ad can be delayed. Such situations can arise, for example, when two different ads have overlapping display times. For example, assume that a first ad has a start time of 4:01 pm and has a cycle time of 2 minutes, and a second ad has a start time of 4:02 pm and has a cycle time of 2 minutes. If the first ad has a higher priority than the second ad, then the first ad is displayed starting at 4:01 pm and ending at 4:03 pm. The second ad can then be displayed starting at 4:03 pm and ending at 4:04 pm.

Ads can be associated with subscriber groups in different manners. In one or more embodiments, the subscriber group associated with an ad is included when the ad is sent to consumer device 106 (e.g., as part of the multicasting, unicasting, streaming, and so forth as discussed above). Event trigger module 108 (or alternatively another module) can update EPG data 110 to reflect this subscriber group. For example, each ad event in EPG data 110 that corresponds to the ad can be updated to include an identifier of the subscriber group received with the ad.

In other embodiments, the subscriber group associated with the ad is identified based on the subscriber group included in the corresponding ad event. For example, the subscriber group associated with the ad is received as part of the ad event data from EPG service 104 and/or advertising service 102. Alternatively, other mechanisms can be used to associate ads with subscriber groups, such as sending separate notifications of the associations, having default associations (e.g., default to the "everyone" subscriber group unless some indication to the contrary), and so forth.

In one or more embodiments, ads are stored in ad store 112. Ad store 112 is cleaned up at regular or irregular intervals so that old ads that are no longer being used are no longer stored by consumer device 106. These old ads can be identified in different manners, such as having an end date and/or time associated with them indicating when they are no longer being used. In one or more embodiments, consumer device 106 includes digital video recorder (DVR) functionality, and each ad is stored as a file by a DVR module or component. Each of these files has an associated end date that is assigned by the DVR module or component, by advertising service 102, or alternatively by another module or component. The DVR module or component uses this end date to determine when the file (and thus the ad) is no longer being used. For cleanup purposes, the DVR module or component can treat these files that include ads in the same manner as it treats any other files.

Additionally, in one or more embodiments event trigger module 108 maintains a record of which ads were displayed or otherwise presented by consumer device 106. Each time an ad event is triggered, an indication of the ad event and/or corresponding ad is recorded. Other information regarding the triggering can optionally be recorded, such as the time when the ad was presented, a duration of the presentation of the ad, whether the ad was available from ad store 112 or was streamed to device 106, and so forth. This record can optionally be returned to advertising service 102, allowing service 102 to be informed of which ads were actually presented on consumer device 106.

Figure 3:
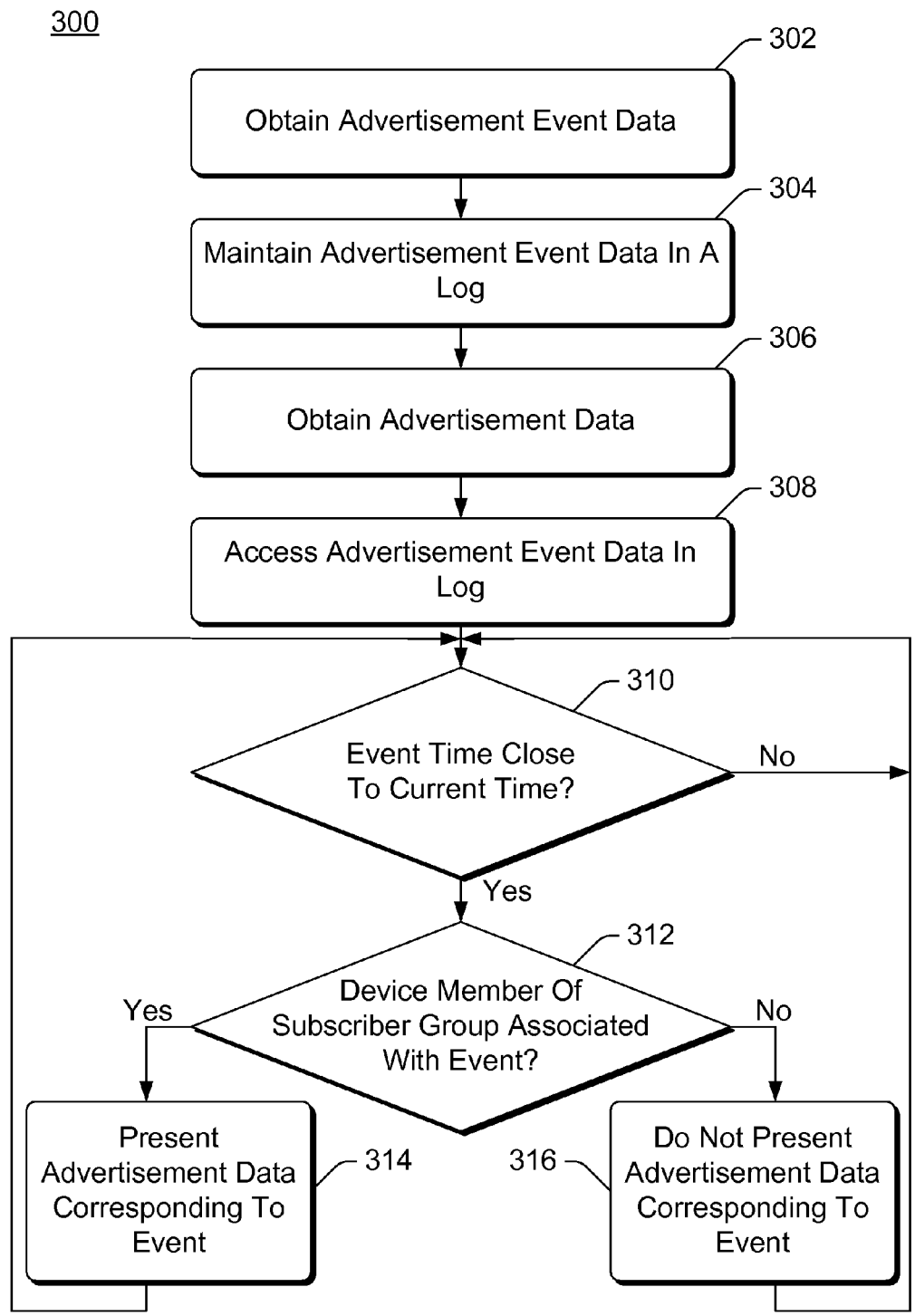
FIG. 3 is a flowchart illustrating an example process for log-based targeting of advertisements to groups in accordance with one or more embodiments.

FIG. 3 is a flowchart illustrating an example process 300 for log-based targeting of advertisements to groups in accordance with one or more embodiments. Process 300 is carried out by a device, such as consumer device 106 of FIG. 1, and can be implemented in software, firmware, hardware, or combinations thereof. Process 300 is an example process for log-based targeting of advertisements to groups; additional discussions of log-based targeting of advertisements to groups are included herein with reference to different figures.

In one or more embodiments, advertisement event data is obtained (act 302) and maintained in a log (act 304). This log can be, for example, EPG data at the device. As discussed above, the ad event data can be received from different sources, such as an EPG service, an advertising service, and so forth.

Additionally, ad data is obtained (act 306). This ad data can be obtained in different manners as discussed above, such as multicasting, unicasting, streaming, and so forth. The ad event data is monitored to identify when the event time of an ad event is close to (e.g., within a threshold amount of time of) a current time (act 310). As discussed above, identifying when the event time of an ad event is close to a current time can be identified in different manners.

When the event time of an ad event is close to the current time, a check is made as to whether the device is a member of a subscriber group associated with the ad event (act 312). As discussed above, ad events can be associated with different subscriber groups at different times and in different manners. If the device is a member of the subscriber group associated with the event, then the ad data corresponding to the event is displayed or otherwise presented (act 314). The ad data is displayed at the event time, which can be displaying the ad when a current time matches (is the same as), as well as displaying the ad an amount of time prior to or after the event time. However, if the device is not a member of the subscriber group associated with the event, then the ad data corresponding to the event is not displayed or otherwise presented (act 316).

Figure 4:
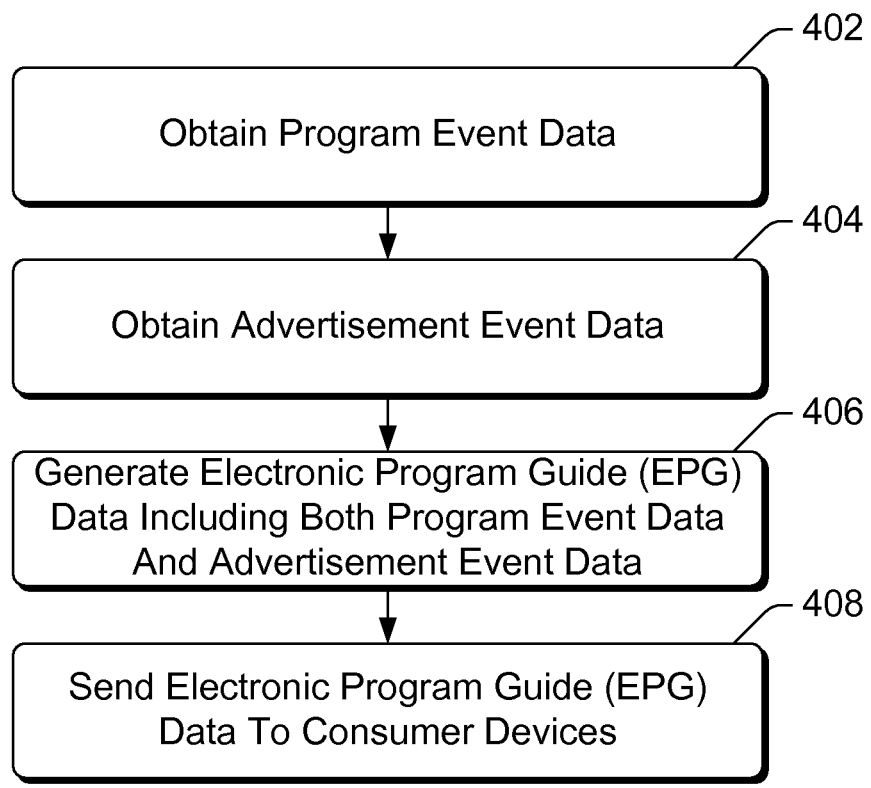
FIG. 4 is a flowchart illustrating an example process for log-based targeting of advertisements to groups in accordance with one or more embodiments.

FIG. 4 is a flowchart illustrating an example process 400 for log-based targeting of advertisements to groups in accordance with one or more embodiments. Process 400 is carried out by an EPG service, such as EPG service 104 of FIG. 1, and can be implemented in software, firmware, hardware, or combinations thereof. Process 400 is an example process for log-based targeting of advertisements to groups; additional discussions of log-based targeting of advertisements to groups are included herein with reference to different figures.

In one or more embodiments, program event data is obtained (act 402) and ad event data is obtained (act 404). This event data can be obtained from different sources, as discussed above. EPG data is then generated including both the program event data and the ad event data (act 406). This EPG data is then sent to one or more consumer devices (act 408). Once at the one or more consumer devices, an event trigger module can use the EPG data to display ads corresponding to the ad events in the EPG data, as discussed above.

It should be noted that processes 300 and 400 of FIGS. 3 and 4 show acts that are performed by one or more devices. The processes shown are not necessarily limited to the orders shown for performing the acts. For example, in FIG. 4, the program event data can be obtained before, after, or concurrent with obtaining the advertisement event data. By way of another example, in FIG. 3 advertisement data can be obtained (e.g., streamed) before, after, or concurrent with the determining whether the device is a member of the subscriber group associated with the event.

Figure 5:
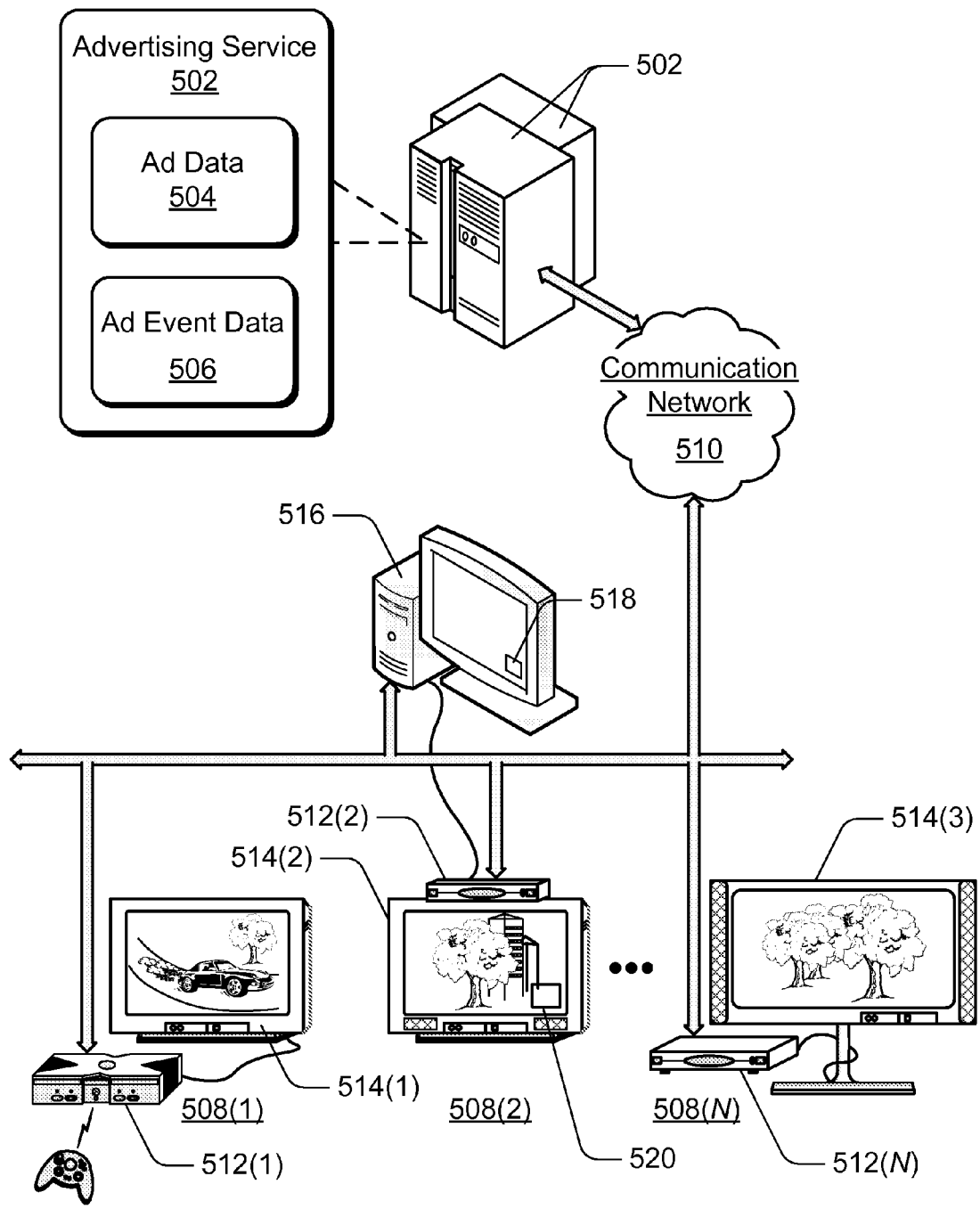
FIG. 5 illustrates another example system in which one or more embodiments of log-based targeting of advertisements to groups can be implemented.

FIG. 5 illustrates another example system 500 in which one or more embodiments of log-based targeting of advertisements to groups can be implemented. System 500 includes advertising service 502 that communicates ad data 504 and ad event data 506 to any number "N" of various television client systems 508(1-N) via a communication network 510. Advertising service 502 can be, for example, advertising service 102 of FIG. 1, and client systems 508 can each be, for example, a consumer device 106 of FIG. 1. Communication network 510 can be implemented to include an IP-based network that facilitates data distribution and communication between advertising service 502 and any number of television client devices.

Each of client systems 508(1-N) includes a respective television client device 512(1-N) and a respective display device 514(1-N), such as any type of television, monitor, LCD, projector, or similar television-based display system that renders audio, video, and/or image data. Any of the client devices 512(1-N) can be implemented as any one or combination of a television client device, a gaming system, or as any other computing-based device, such as a desktop computer, a portable computer, a television set-top box, a DVR, an appliance device, a gaming console, and/or as any other type of computing-based client device. Any of the television client devices 512(1-N) may also be associated with a user (e.g., a person) and/or an entity that operates a client device such that a television client device describes logical clients that include users, software, and/or devices.

Any of the television client devices 512(1-N) of the respective client systems 508(1-N) can be implemented with one or more processors, a communication module, memory components, a media content rendering system, and an event trigger module to implement embodiments of log-based targeting of advertisements to groups. Additionally, each of the television client devices 512(1-N) can be configured for communication with any number of different advertising services 502 to receive any type of ad data 504 and the ad event data 506 via the communication network 510. Further, any of the television client devices 512(1-N) can be implemented with any number and combination of differing components as further described with reference to the example client device shown in FIG. 6.

In this example, client device 512(2) is a television set-top box that is connected, or otherwise communicatively linked, to a computing device 516 that can be implemented to display an advertisement, such as advertisement 518 or advertisement 520. Computing device 516 can also be configured for communication with an advertising service 502 to receive the ad data 504 and ad event data 506 via the communication network 510.

Figure 6:
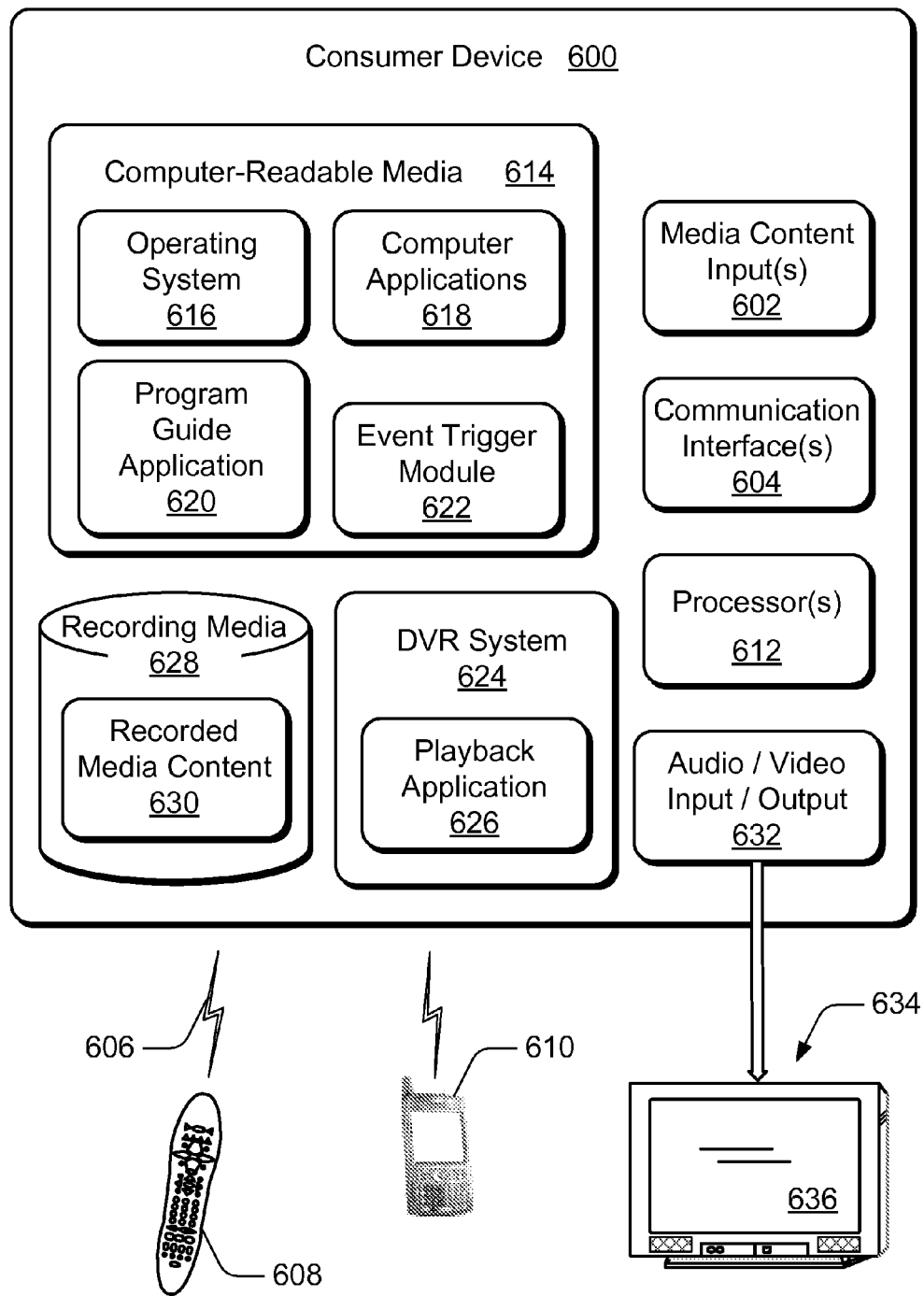
FIG. 6 illustrates various components of an example consumer device that can be implemented as any form of a computing, electronic, or television client device to implement embodiments of log-based targeting of advertisements to groups.

FIG. 6 illustrates various components of an example consumer device 600 that can be implemented as any form of a computing, electronic, or television client device to implement embodiments of log-based targeting of advertisements to groups. For example, consumer device 600 can be implemented as consumer device 106 shown in FIG. 1, and/or as any of the client devices 512(1-N) of the client systems 508 (1-N) shown in FIG. 5. In various embodiments, consumer device 600 can be implemented as any one or combination of a television client device, a gaming system, or as any other computing-based device, such as a desktop computer, a portable computer, a television set-top box, a DVR, an appliance device, a gaming console, and/or as any other type of computing-based client device.

Consumer device 600 includes one or more media content inputs 602 that may include Internet Protocol (IP) inputs over which streams of media content are received via an IP-based network. Consumer device 600 further includes communication interface(s) 604 that can be implemented as any one or more of a serial and/or parallel interface, a wireless interface, any type of network interface, a modem, and as any other type of communication interface. A wireless interface enables consumer device 600 to receive control input commands 606 and other information from an input device, such as from remote control device 608, a portable computing-based device (such as a cellular phone) 610, or from another infrared (IR), 802.11, Bluetooth, or similar RF input device.

A network interface provides a connection between consumer device 600 and a communication network by which other electronic and computing devices can communicate data with device 600. Similarly, a serial and/or parallel interface provides for data communication directly between consumer device 600 and the other electronic or computing devices. A modem facilitates consumer device 600 communication with other electronic and computing devices via a conventional telephone line, a DSL connection, cable, and/or other type of connection.

Consumer device 600 also includes one or more processors 612 (e.g., any of microprocessors, controllers, and the like) which process various computer-executable instructions to control the operation of device 600, to communicate with other electronic and computing devices, and to implement embodiments of log-based targeting of advertisements to groups. Consumer device 600 can be implemented with computer-readable media 614, such as one or more memory components, examples of which include random access memory (RAM), nonvolatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 614 provides data storage mechanisms to store various information and/or data such as software applications and any other types of information and data related to operational aspects of client device 600. For example, an operating system 616 and/or other computer applications 618 can be maintained as software applications with the computer-readable media 614 and executed on processor(s) 612 to implement embodiments of log-based targeting of advertisements to groups.

Consumer device 600 can also include a program guide application 620 that is implemented to process electronic program guide data and generate program guides for display based on the program events included therein. A program guide enables a viewer to navigate through an onscreen display and locate various media content such as broadcast programs, recorded programs, video on demand programs and movies, interactive game selections, network-based applications, and other media content of interest to the viewer. This various media content is identified using the program event data discussed above. Consumer device 600 can also include an event trigger module 622 (shown as a software module in this example), such as event trigger module 108 of FIG. 1, to implement various embodiments of log-based targeting of advertisements to groups as described herein.

Consumer device 600 can also include a DVR system 624 with playback application 626, and recording media 628 to maintain recorded media content 630 that consumer device 600 receives and/or records. Further, consumer device 600 may access or receive additional recorded media content that is maintained with a remote data store (not shown). Consumer device 600 may also receive media content from a video on demand server, or media content that is maintained at a broadcast center or content distributor that distributes the media content to subscriber sites and client devices. The playback application 626 is a video control application that can be implemented to control the playback of media content, the recorded media content 630, and/or other video on demand media content, music, and any other audio, video, and/or image media content which can be rendered and/or displayed for viewing.

Consumer device 600 also includes an audio and/or video output 632 that provides audio and/or video data to an audio rendering and/or display system 634. The audio rendering and/or display system 634 can include any devices that process, display, and/or otherwise render audio, video, and image data. Video signals and audio signals can be communicated from client device 600 to a display device 636 via an RF (radio frequency) link, S-video link, composite video link, component video link, DVI (digital video interface), analog audio connection, or other similar communication link. Alternatively, the audio rendering and/or display system 634 can be implemented as integrated components of the example client device 600. Client device 600 along with the audio rendering and/or display system 634 is an example of a viewing system that can be implemented in a household viewing area for viewing television programs and/or receiving other television media content.

Figure 7:
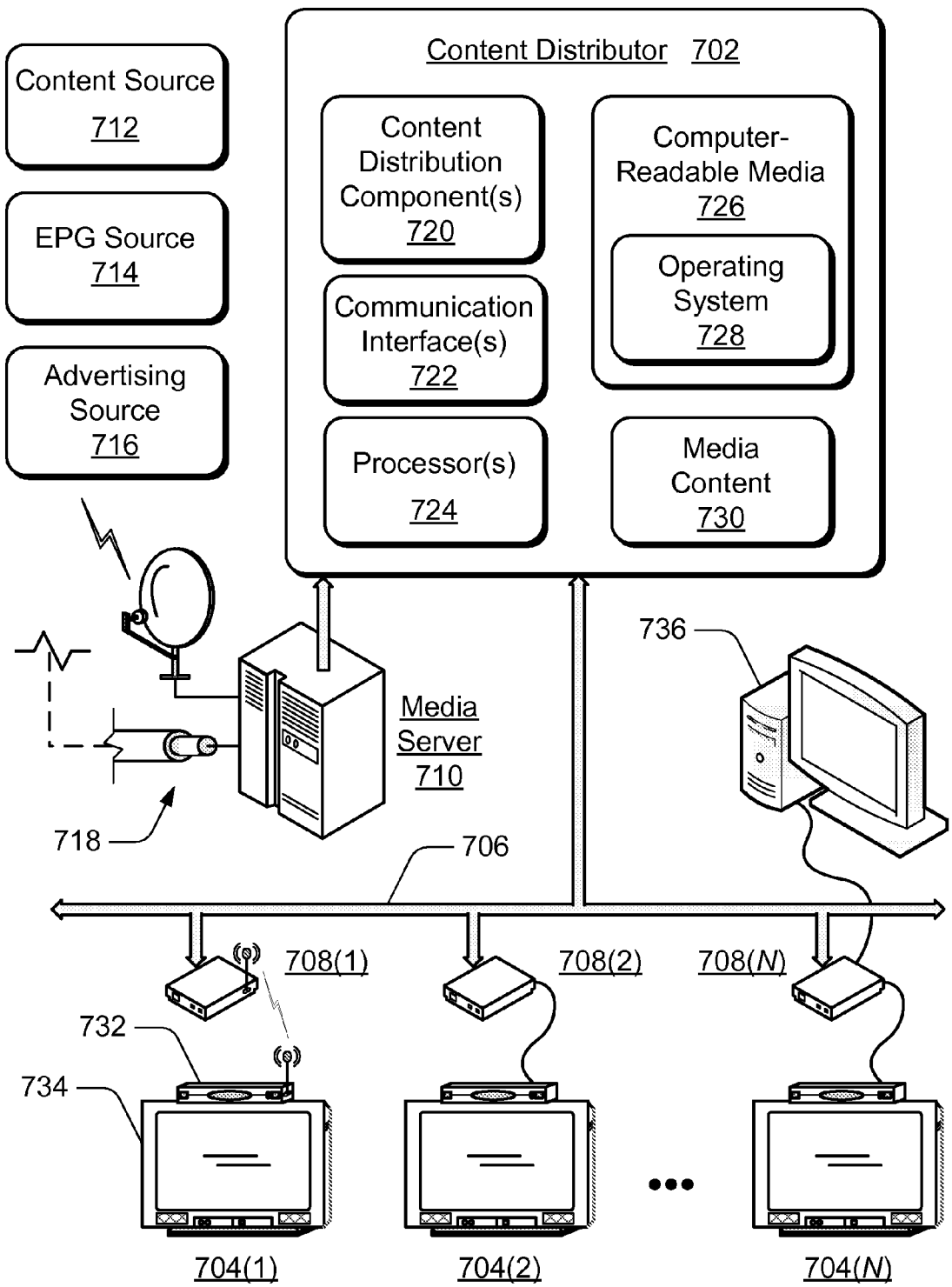
FIG. 7 illustrates an example entertainment and information system in which embodiments of log-based targeting of advertisements to groups can be implemented.

FIG. 7 illustrates an example entertainment and information system 700 in which embodiments of log-based targeting of advertisements to groups can be implemented. System 700 facilitates the distribution of media content, electronic program guide data, and advertising content to multiple viewers and to multiple viewing systems. System 700 includes a content distributor 702 and any number "N" of client systems 704(1-N) each configured for communication via a communication network 706. Each client system 704(1-N) is an example of the client systems 508(1-N) described with reference to FIG. 5. Each of the client systems 704(1-N) can receive data streams of media content, program content, electronic program guide data, advertisement data, closed caption data, and the like from content server(s) of the content distributor 702 via the communication network 706.

Communication network 706 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 706 can be implemented using any type of network topology and any network communication protocol, and can be represented or otherwise implemented as a combination of two or more networks. A digital network can include various hardwired and/or wireless links 708(1-N), routers, gateways, and so on to facilitate communication between content distributor 702 and the client systems 704(1-N).

System 700 includes a media server 710 that receives media content from a content source 712, electronic program guide data from an electronic program guide (EPG) source 714, and advertisement data from an advertising source 716. EPG source 714 also optionally receives advertisement event data from advertising source 716. In one or more embodiments, media server 710 represents an acquisition server that receives the audio and video media content from content source 712, an EPG server that receives the program guide data from program guide source 714, and/or an advertising management server that receives the advertisement data and advertisement event data from the advertising source 716.

Content source 712, program guide source 714, and advertising source 716 control distribution of the media content, the electronic program guide data, and the advertisement data and advertisement event data to the media server 710 and/or to other servers or sources. The media content, electronic program guide data, advertisement data, and advertisement event data can be distributed via various transmission media 718, such as satellite transmission, radio frequency transmission, cable transmission, and/or via any number of other wired or wireless transmission media. In this example, media server 710 is shown as an independent component of system 700 that communicates the program content, electronic program guide data, and advertisement data to content distributor 702. In an alternate implementation, media server 710 can be implemented as a component of content distributor 702.

Content distributor 702 is representative of a headend service in a content distribution system, for example, that provides the media content, electronic program guide data, and advertisement data to multiple subscribers (e.g., the client systems 704(1-N)). Content distributor 702 can be implemented as a satellite operator, a network television operator, a cable operator, and the like to control distribution of media content, program and advertisement content, such as movies, television programs, commercials, bugs, music, and other audio, video, and/or image content to the client systems 704(1-N).

Content distributor 702 includes various content distribution components 720 to facilitate media content processing and distribution, such as a subscriber manager, a device monitor, and one or more content servers. The subscriber manager manages subscriber data, and the device monitor monitors the client systems 704(1-N) (e.g., and the subscribers), and maintains monitored client state information.

Although the various managers, servers, and monitors of content distributor 702 (to include the media server 710 in one embodiment) are described as distributed, independent components of content distributor 702, any one or more of the managers, servers, and monitors can be implemented together as a multi-functional component of content distributor 702. Additionally, any one or more of the managers, servers, and monitors described with reference to system 700 can implement features and embodiments of interactive ticker.

Content distributor 702 includes communication interface(s) 722 that can be implemented as any type of interface to communicate and receive data from client devices of the television system. Content distributor 702 also includes one or more processors 724 (e.g., any of microprocessors, controllers, and the like) which process various computer-executable instructions to control the operation of content distributor 702. Content distributor 702 can be implemented with computer-readable media 726 which provides data storage to maintain software applications such as an operating system 728 and media content 730 for distribution to the client systems 704(1-N).

Client systems 704(1-N) can each be implemented to include a client device 732 and a display device 734 (e.g., a television, LCD, projector, and the like). A client device 732 of a respective client system 704 can be implemented in any number of embodiments, such as a set-top box, a DVR and playback system, an appliance device, a gaming system, and as any other type of consumer device that may be implemented in an entertainment and information system. In an alternate embodiment, client system 704(N) is implemented with a computing device 736 as well as a client device. The computing device 736 is an example of a connected data store that can record and maintain media content for a client device. Additionally, any client device 732 of a respective client system 704 can implement features and embodiments of log-based targeting of advertisements to groups.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer-readable memory devices. The features of the log-based targeting of advertisements to groups techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented in a consumer device, the method comprising:
   monitoring goods and services purchased via the consumer device by a user of the consumer device;
   receiving advertisement event data as part of a multicast sent to multiple consumer devices, the advertisement event data indicating a time when an advertisement is to be presented and subscriber groups to which the advertisement is to be presented, and being sent as part of the multicast to at least some of the consumer devices that are not members of the subscriber groups to which the advertisement is to be presented, the consumer device maintaining an indication of one or more subscriber groups of which the consumer device is a member and deleting the advertisement event data that is received as part of the multicast and does not correspond to the one or more subscriber groups of which the consumer device is a member, the one or more subscriber groups of which the consumer device is a member being based in part on the goods and services purchased via the consumer device by the user of the consumer device;

maintaining the advertisement event data in a log;

checking, approximately when the advertisement is to be presented, whether the consumer device is a member of the subscriber groups to which the advertisement is to be presented; and presenting advertisement data corresponding to the advertisement event data, the advertisement data presented as an image that temporarily overlays a portion of video content being displayed by the consumer device, the advertisement data displayed as the image at the indicated time if the advertisement event data corresponds to one or more of the subscriber groups of which the consumer device is a member, otherwise not presenting the advertisement data.

2. A method as recited in claim 1, wherein the image that temporarily overlays the portion of the video content is displayed as a bug.

3. A method as recited in claim 1, wherein the log comprises an electronic program guide.

4. A method as recited in claim 1, wherein receiving the advertisement event data comprises receiving the advertisement event data with program event data as part of electronic program guide data.

5. A method as recited in claim 1, wherein the multicast with which the advertisement event data is received includes an indication of the subscriber group to which the advertisement event data corresponds.

6. A method as recited in claim 1, further comprising streaming the advertisement data from a remote source.

7. A method as recited in claim 1, further comprising:
checking whether the advertisement data is available from a local advertisement store; and
wherein presenting the advertisement data further comprises presenting the advertisement data only if the advertisement data is available from the local advertisement store, and otherwise not presenting the advertisement data.

8. A method as recited in claim 1, further comprising:
checking whether the advertisement data is available from a local advertisement store;
if the advertisement data is available from the local advertisement store, then presenting the advertisement data from the local advertisement store; and
if the advertisement data is not available from the local advertisement store, then retrieving the advertisement data from a remote source.

9. A method as recited in claim 8, wherein retrieving the advertisement data from a remote source comprises streaming the advertisement data from the remote source.

10. One or more computer-readable memory devices having stored thereon multiple instructions that, when executed by one or more processors of a consumer device, cause the one or more processors to:
monitor goods and services purchased via the consumer device by a user of the consumer device;
retrieve bug event data from electronic program guide data, the bug event data indicating a time when bug data that corresponds to a bug event is to be displayed as an image to subscriber groups, the bug data being received at the consumer device as part of a multicast sent to multiple consumer devices including at least some of the consumer devices that are not members of the subscriber groups to which the bug event is to be displayed, the consumer device maintaining an indication of one or more of the subscriber groups of which the consumer device is a member and deleting the bug data that is received as part of the multicast and does not correspond to the one or more subscriber groups of which the consumer device is a member, the one or more subscriber groups of which the consumer device is a member being based in part on the goods and services purchased via the consumer device by the user of the consumer device;
check, approximately when the bug data is to be displayed, whether the consumer device is a member of the subscriber groups to which the bug data is to be displayed;
if the bug event data corresponds to one or more of the subscriber groups of which the consumer device is a member, then temporarily display the bug data as the image overlaying at least a portion of video being played back by the consumer device; and
if the bug event data does not correspond to one or more of the subscriber groups of which the consumer device is a member, then do not display the bug data.

11. One or more computer-readable memory devices as recited in claim 10, the multiple instructions further causing the one or more processors to receive the bug event data with program event data as part of the electronic program guide data.

12. One or more computer-readable memory devices as recited in claim 10, the multiple instructions further causing the one or more processors to:
receive the bug event data from an advertising service; and
incorporate the bug event data into the electronic program guide data.

13. One or more computer-readable memory devices as recited in claim 10, wherein the multicast includes an indication of the identifier of the subscriber groups for the bug event data corresponding to the bug data.

14. One or more computer-readable memory devices as recited in claim 10, the multiple instructions further causing the one or more processors to stream the bug data from a remote source.

15. One or more computer-readable memory devices as recited in claim 10, the multiple instructions further causing the one or more processors to:
check whether the bug data is available from a local store; and
wherein to display the bug data is to display the bug data only if the bug data is available from the local store, and otherwise not display the bug data.

16. One or more computer-readable memory devices as recited in claim 10, the multiple instructions further causing the one or more processors to:
check whether the bug data is available from a local store;
if the bug data is available from the local store, then display the bug data from the local store; and
if the bug data is not available from the local store, then retrieve the bug data from a remote source.

17. One or more computer-readable memory devices as recited in claim 10, wherein the bug data comprises a video.

18. A method comprising:
receiving program event data that corresponds to a program configured for broadcast to multiple consumer devices;
receiving advertisement event data including, for each of one or more advertisement events, a subscriber group portion that includes an indication of subscriber groups that corresponds to an advertisement event, a start time portion that includes an indication of a start time for the advertisement event, and a priority portion that includes a priority indicating that the advertisement event is to be presented, beginning at the start time, instead of a different advertisement event having a lesser priority when the advertisement event and the different advertisement event have a same start time, the advertisement event corresponding to advertisement data that is sent as part of a multicast to the multiple consumer devices including at least some of the consumer devices that are not members of the subscriber groups to which the advertisement is to be displayed;

generating electronic program guide data including both the program event data and the advertisement event data; and sending the electronic program guide data to the multiple consumer devices, a consumer device maintaining an indication of one or more subscriber groups of which the consumer device is a member and deleting the advertisement event data that is received as part of the multicast and does not correspond to the one or more subscriber groups of which the consumer device is a member, the one or more subscriber groups of which the consumer device is a member being based in part on goods and services purchased via the consumer device.

19. A method as recited in claim 18, the advertisement event data in the electronic program guide data further including, for each of the one or more advertisement events:

an ad identifier portion that includes an identifier of an advertisement corresponding to the advertisement event.

20. A method as recited in claim 19, the advertisement event data in the electronic program guide data including, for each of the one or more advertisement events:

a cycle time portion that includes an identifier of when presentation of the advertisement is to stop.

* * * * *